(12) United States Patent
von Schwertfuehrer

(10) Patent No.: US 7,801,963 B2
(45) Date of Patent: Sep. 21, 2010

(54) METHOD FOR MONITORING DISTRIBUTED SOFTWARE

(75) Inventor: Gerit Edler von Schwertfuehrer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 1215 days.

(21) Appl. No.: 10/888,099

(22) Filed: Jul. 8, 2004

(65) Prior Publication Data

US 2005/0044214 A1     Feb. 24, 2005

(30) Foreign Application Priority Data

Jul. 14, 2003    (DE) ................................ 103 31 873

(51) Int. Cl.
*G06F 15/16* (2006.01)
(52) U.S. Cl. ....................... 709/208; 709/203
(58) Field of Classification Search ................. 709/203, 709/208
See application file for complete search history.

(56) References Cited

U.S. PATENT DOCUMENTS

| | | | | |
|---|---|---|---|---|
| 5,444,851 | A * | 8/1995 | Woest | 709/222 |
| 6,144,992 | A * | 11/2000 | Turpin et al. | 709/208 |
| 6,327,668 | B1 * | 12/2001 | Williams | 714/2 |
| 7,174,482 | B2 * | 2/2007 | Voleti et al. | 714/39 |
| 2002/0073086 | A1 * | 6/2002 | Thompson et al. | 707/10 |
| 2002/0194335 | A1 * | 12/2002 | Maynard | 709/225 |
| 2006/0251124 | A1 * | 11/2006 | Colmant et al. | 370/503 |

FOREIGN PATENT DOCUMENTS

DE     44 38 714     5/1996

\* cited by examiner

*Primary Examiner*—Salad Abdullahi
*Assistant Examiner*—El Hadji M Sall
(74) *Attorney, Agent, or Firm*—Kenyon & Kenyon LLP

(57) ABSTRACT

A method for monitoring distributed software, as well as a computer program and a computer program product. In the method, the software, distributed to a number of computer units, is executed. One of the computer units is assigned a master module and the other computer units are assigned a slave module each. Monitoring is performed via communication in master-slave operation between the master module and the slave modules.

16 Claims, 3 Drawing Sheets

METHOD FOR MONITORING DISTRIBUTED SOFTWARE

FIELD OF THE INVENTION

The present invention relates to a method for monitoring distributed software, as well as a control unit and a computer program for carrying out the method.

BACKGROUND INFORMATION

Different concepts for designing a control unit to be safe against individual errors or to be intrinsically safe are known. Known ESP/ABS control units, for example, perform monitoring using the two-computer method, the functional software being computed simultaneously on a second, mostly identical computer and the results of both computers being compared. This method is known to be intrinsically safe. It is, however, expensive, due to the use of two computers.

German Patent Application No. DE 44 38 714 describes a method and a device for controlling a propulsion unit of a vehicle. Only one computing element is used here for performance control, this element performing both control functions and monitoring functions. At least two independent levels are defined in the computing element for this purpose, a first level performing the control function and a second level performing the monitoring function.

Another known, advantageous possibility to achieve intrinsic safety of a control unit is monitoring using the three-level method. In this method the second computer is replaced by a more advantageous monitoring module.

Today's engine control units monitor ETC/EGAS systems according to the three-level method. The engine control unit here includes a function computer and a monitoring module, known as a watchdog. The function computer and the monitoring module communicate via question-answer communication and have separate shut-off paths. In the three-level method, level 1 is the actual function software, which is required for operating the engine. Level 1 is executed on the function computer. On level 2, which is also executed on the function computer, a permissible torque is compared with an actual engine torque based on a simplified engine model. Level 2 is executed in a hardware area secured by level 3. Components of level 3 include the instruction test, the program sequence control, the A/D converter test, as well as cyclic and complete memory tests. In current ETC/EGAS systems, the entire function and monitoring software is located in a single control unit.

It must be taken into account that, with the increasing number of control units in the vehicle, the need for trans-controller software for smart, overall regulation of different systems increases.

SUMMARY OF THE INVENTION

In the method according to the present invention for monitoring distributed software executed on a number of computer units associated with at least one control unit, one of the computer units is assigned a master module and the other computer units are assigned a slave module each. Communication in master-slave operation is performed between the master module and the slave modules for monitoring.

The method according to the present invention represents an encapsulated monitoring concept for safety-relevant software, which is distributed to different interconnected control units. Individual safety-relevant errors are detected by the monitoring method, so that a controllable vehicle response may be ensured.

The safety of a system against individual errors may thus be ensured using safety-relevant distributed software. Errors which are also recognizable using the above-mentioned three-level method for a control unit are recognized. Important advantages of the method according to the present invention include flexibility in hardware and software and the hardware independence which is achieved. Due to the structuring of the software modules according to the master-slave principle, it is also possible to use the slave modules on control units without monitoring modules.

Another advantage is the possibility to freely distribute the level 1 software within the set of control units. A modular structure of the level 2 software and the appropriate design of the slave modules make free configurability possible. In addition, the method according to the present invention is not limited to a certain number of control units. It is able to monitor from 0 to n slave modules.

Monitoring may take place, for example, in that queries by the master module are answered by the slave modules, which return appropriate responses to the master module, and these responses are analyzed to check for faultless operation. In the event of an error, the master module then typically initiates an error response.

In one possible embodiment of the method, the master module asks a single question, which is read and appropriately answered by all slave modules. It is advantageous here that only a short time delay occurs until the responses of all slave modules are available. In the event of an error, it must be recognized which slave module is defective, so that a shut-down of the entire system may possibly be avoided.

Communication preferably takes place between the master module and the associated control unit.

The computer units may be associated with one control unit or a plurality of control units. The method according to the present invention is thus also utilizable in the case of software distributed to different computer units, i.e., processors within a control unit.

The master module and/or the slave modules typically have a fixed component and a variable component.

The computer program according to the present invention includes program code means for performing all steps of the above-described method according to the present invention when it is executed on a computer or a computing unit, in particular a computer unit in a control unit, for example, an engine control unit.

The computer program product according to the present invention has these program code means which are stored on a computer-readable data medium.

DETAILED DESCRIPTION

Figure 1:
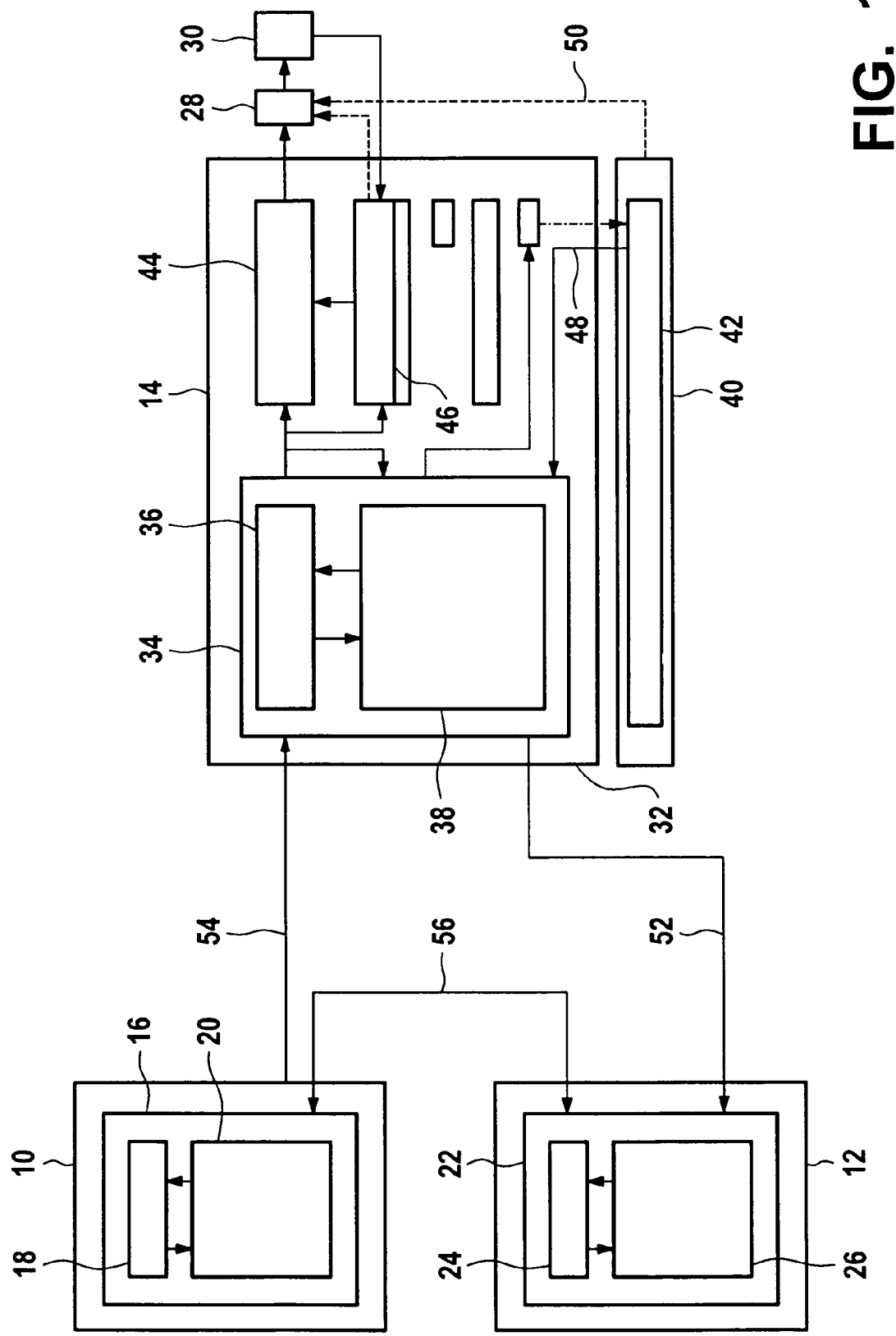
FIG. 1 shows a schematic representation of a possible application of the method according to the present invention.

The application illustrated in FIG. 1 is used for monitoring for undesired acceleration of a vehicle equipped with an ETC/EGAS system. This concept is similarly applicable for monitoring for undesired deceleration. In hybrid vehicles, for example, the electric motor may be included in the concept. A series of further application possibilities of the concept are implementable, such as, for example, a set of control units having a central control unit, a set of control units having a control unit for the electric motor and/or a control unit for the battery, monitoring for undesired deceleration or undesired acceleration or a combination of monitoring for undesired deceleration and undesired acceleration, in which case no additional master module is required.

In FIG. 1, the master module of level 2 is located in the engine control unit for the application of monitoring for undesired acceleration. A level 2 slave module is integrated in each additional control unit containing safety-relevant software of the forward propulsion path. The level 2 modules are distributed following functional criteria, similarly to the distribution of the function software.

FIG. 1 schematically shows a first control unit 10, a second control unit 12, and an engine control unit 14. A slave module is associated with each of the two control units 10 and 12, and a master module is associated with engine control unit 14.

A first level 16, in which a functionality 18 and monitoring 20 of the slave module take place, is illustrated in first control unit 10.

A first level 22, having a functionality 24 and monitoring 26 is also illustrated in second control unit 12.

Engine control unit 14 is connected to an engine 30 via an output stage 28. A first level 34, in which a functionality 36 of one of the two control units 10, 12 and monitoring 38 by the master module take place is illustrated in the engine control unit, i.e., in a function computer 32 associated with the engine control unit. Engine control unit 14 is connected to a monitoring module 40 having integrated hardware 42. The functionality of engine control unit 14 is executed in a further first level 44. This functionality is monitored in a second level 46.

In monitoring for undesired acceleration, it is important that a secure shut-off option of the engine output stages be provided. It must be ensured that in the event of an error, there is the option at all times of preventing combustion which would increase engine power. This is achieved by the system initially performing a shut-off path test. After the master module is initialized, each slave module requests a shut-off of the ignition output stage. The master module forwards this shut-off request to engine control unit 14 and has it confirm correct receipt. If engine control unit 14 confirms receipt of the shut-off request, it may be assumed that it is also implementable in actual operation.

The master module then sends an enable to the slave modules, and the regular program sequence may begin. As an alternative, it is also conceivable, for example, to disengage the clutch in an emergency to prevent the driven wheels from receiving any excessive torque. This shut-off path is conceivable as an alternative if, for example, engine control unit 14 comes from another manufacturer, which allows for no such shut-off path. Regular operation is characterized by two question-answer communication steps:

The first question-answer communication step takes place between the master module and the engine control unit. Arrow 48 denotes the question and arrow 50 denotes the answer. Hardware errors and an erroneous program sequence of the master module are recognized by this question-answer communication. This is particularly important, because a possible incoming shut-off request to engine control unit 14 must be reliably forwarded. In the event of an error, engine control unit 14 initiates an error response.

The second question-answer communication step takes place between the master module and the slave modules. Arrow 52 denotes the question of the master module to the slave module of second control unit 12, and arrow 54 denotes the answer of the slave module of first control unit 10 to the master module of engine control unit 14. A double arrow 56 shows that the question of the slave module of first control unit 10 corresponds to the answer of the slave module of the second control unit.

This second communication step is necessary to encapsulate level 2 of the distributed software. Similarly to the first question/answer communication step, the object of the second communication step is to determine hardware errors in the slave modules and incorrect processing in the individual modules. The answer of a slave module represents, at the same time, the question to the next slave module. The answer of the last slave module is analyzed by the master module. In the event of an error, the master module initiates an error response.

Figure 2:
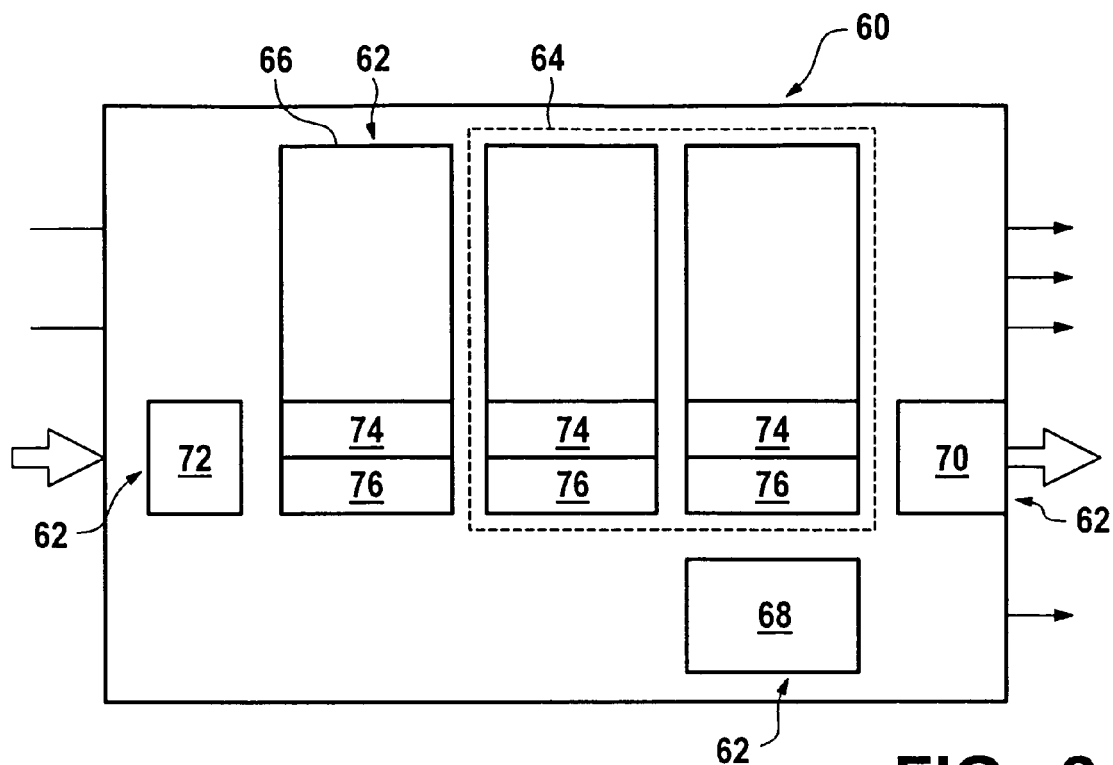
FIG. 2 shows a preferred design of a slave module.

The design in principle of a slave module, labeled overall with the reference number 60, is shown in FIG. 2. It has a fixed component 62 and a variable component 64. Fixed component 62 is used for securing the memory areas (RAM and ROM) 66, which are used by the entire slave module (cyclic test in operation, complete rest test in run-on), as well as shut-off path test 68 and sending 70 and receiving 72 modules. The individual modules of level 2 are integrated as plug-ins in program sequence control 74 and in instruction test 76.

Figure 3:
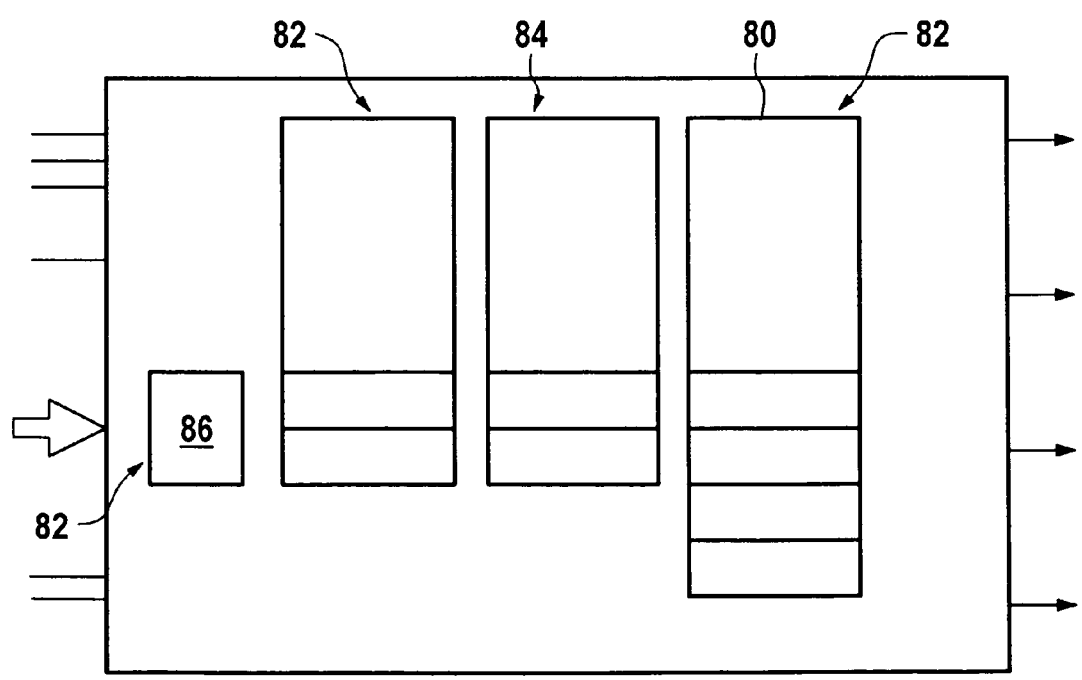
FIG. 3 shows a preferred design of a master module.

The concept of a master module 80 is shown in FIG. 3. Master module 80, like the slave modules, has a fixed component 82 and a variable component 84. A receiving module 86 is also provided. The memory test corresponds to that of the slave modules. The central component is master module 80 itself. In this program portion, the question-answer communication with the slave modules is analyzed and the communication with the engine control unit is participated in. Modules of level 2 may be additionally integrated as plug-ins, as in the case of the slave modules.

The A/D converter is monitored in a special level 2 module in the control unit, where safety-relevant information about an A/D converter is input. In the case of monitoring for undesired acceleration, this is, in particular, the control unit, where the voltages of the pedal value transducer, i.e., of the gas pedal module, are input. The module is integrated, similarly to the other level 2 modules, either in the master module or in one of the slave modules according to the plug-in principle. An A/D converter may be tested, for example, using the idling test pulse method in which the input voltage of an AS channel is cyclically drawn to low by the software.

The different control units exchange information via an intrinsically safe connection such as CAN, TTT, TTCAN, etc. The communication paths may thus be monitored in time and value ranges.

Figure 4:
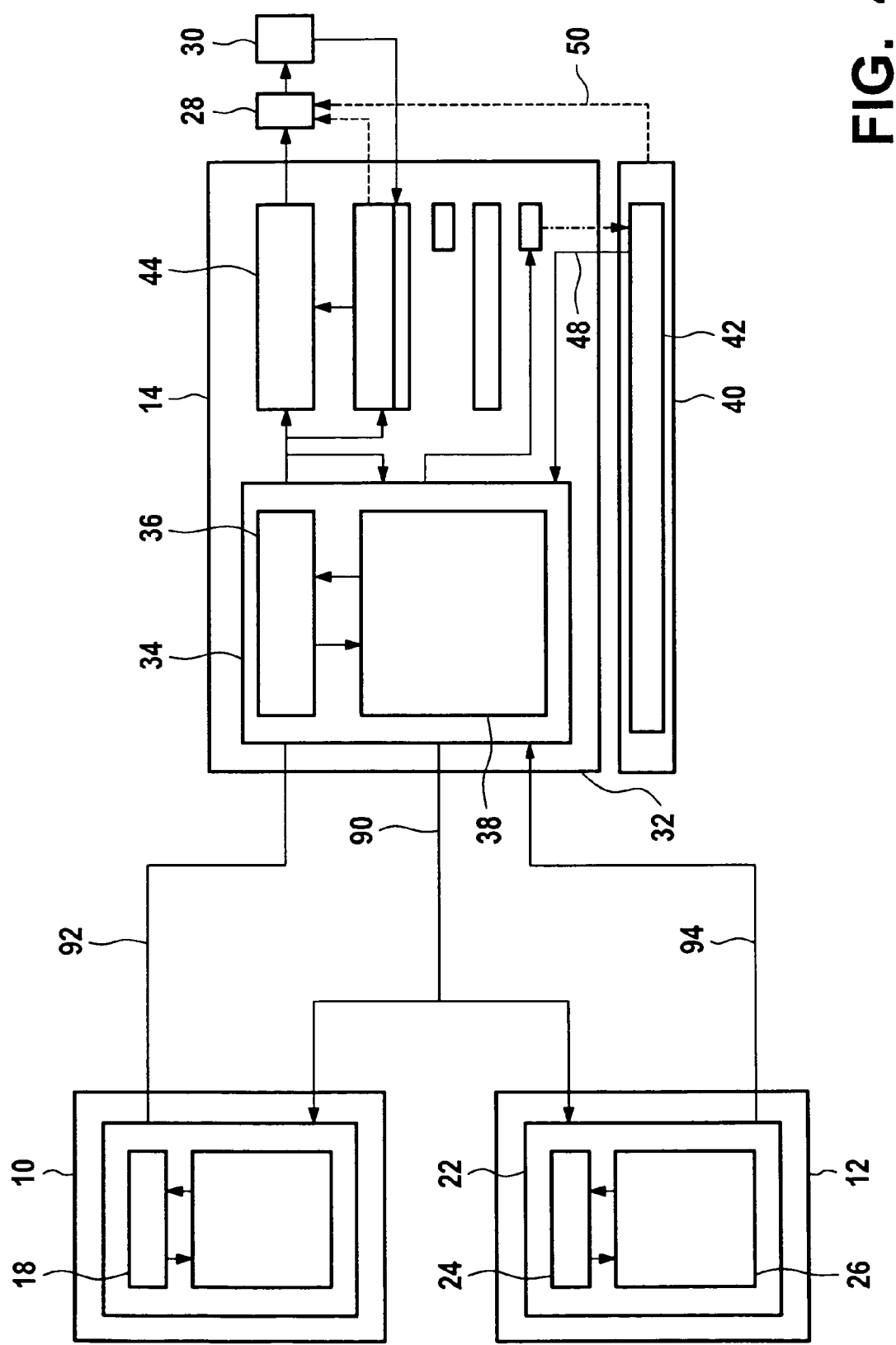
FIG. 4 shows another possible application of the method according to the present invention.

FIG. 4 illustrates another question-answer communication procedure, which differs from that shown in FIG. 1.

The master poses a question (arrow 90), which is read and answered by all slave modules. Arrow 92 shows the answer of the slave module of first control unit 10 and arrow 94 shows the answer of the slave module of the second control unit.

The advantage of this design compared to that of the question-answer communication illustrated in FIG. 1 is a shorter time delay until the answer can be given (increased advantage with increasing number of control units involved); in addition, in the event of an error it is possible to recognize which slave module is defective, making it possible to avoid a shutdown of the entire system.

The master communicates its error counter content, for example, together with the question. If the error counter content falls below a certain threshold value, a slave module inserts a wrong answer to test whether the master increases the error counter content by the corresponding value at the time of the next question. If this is not the case, the master module is defective and the slave module continues to send wrong answers, which result in an error response in the master control unit due to the linkage with the question-answer communication between the master and the engine control unit.

The monitoring method described in the present application for software distributed to different control units is also applicable to the distribution of software to different computer units, i.e., processors within a control unit. The method also applies to a combination of a plurality of processors within a control unit and the distribution to different control units.

For example, if the software to be monitored is distributed to two processors of a control unit, one of the two processors activates the output stages and communicates with the monitoring module. The monitoring master module is associated with this processor. The functionality of the slave module is implemented on the other processor. The level 2 modules are distributed to master and slave modules similarly to the function software. Since it occurs within the control unit, the communication between master module and slave module may also take place, for example, via an SPI interface (similarly to the communication between the processor and the monitoring module), depending on the hardware configuration. The safety-relevant control unit components, for example, an A/D converter, are monitored within the master module or the slave module depending on the hardware configuration.

What is claimed is:

1. A method for monitoring distributed software which is executed on a number of computer units associated with at least one control unit, the method comprising:
   assigning one of the computer units a master module;
   assigning to each of a plurality of others of the computer units a respective slave module; and
   conducting communication in master-slave operation between the master module and the slave modules for monitoring,
   wherein:
      the communication is conducted such that, in response to a query of the master module to all slave modules, each of the slave modules returns an appropriate response, and the responses are analyzed by the master module to check for faultless operation of the slave modules;
      the master module sends the query to the all slave modules in a first single communication via a first slave module coupled to the master module;
      the master module receives all responses of the all slave modules in a second single communication from a second slave module coupled to the master module;
      the plurality of others of the computer units are serially connected such that the appropriate response of one of the slave modules assigned to one of the computer units includes a query to, and is forwarded to, a slave module assigned to a next one of the plurality of others of the computer units; and
      the master module sends the query of the master module to a first slave module of the serially connected slave modules and receives the responses from a last slave module of the serially connected slave modules.

2. The method according to claim 1, further comprising: posing a question by the master module; and reading and appropriately answering the question by all of the slave modules.

3. The method according to claim 1, wherein a communication takes place between the master module and an associated control unit.

4. The method according to claim 1, wherein the computer units are associated with one control unit.

5. The method according to claim 1, wherein the computer units are associated with a plurality of control units.

6. The method according to claim 1, wherein the master module includes a fixed component and a variable component.

7. The method according to claim 1, wherein the slave modules include a fixed component and a variable component.

8. The method according to claim 1, further comprising initiating an error response by the master module in the event of an error.

9. A processor configured to perform the following steps for monitoring distributed software which is executed on a number of computer units associated with at least one control unit:
   assigning one of the computer units a master module;
   assigning to each of a plurality of others of the computer units a respective slave module; and
   conducting communication in master-slave operation between the master module and the slave modules for monitoring,
   wherein:
      the communication is conducted such that, in response to a query of the master module to all slave modules, each of the slave modules returns an appropriate response, and the responses are analyzed by the master module to check for faultless operation of the slave modules;
      the master module sends the query to the all slave modules in a first single communication via a first slave module coupled to the master module;
      the master module receives all responses of the all slave modules in a second single communication from a second slave module coupled to the master module;
      the plurality of others of the computer units are serially connected such that the appropriate response of one of the slave modules assigned to one of the computer units includes a query to, and is forwarded to, a slave module assigned to a next one of the plurality of others of the computer units; and
      the master module sends the query of the master module to a first slave module of the serially connected slave modules and receives the responses from a last slave module of the serially connected slave modules.

10. A non-transitory computer-readable medium having stored thereon instructions executable by a processor, the instructions which when executed, cause the processor to perform the following steps for monitoring distributed software which is executed on a number of computer units associated with at least one control unit:
   assigning one of the computer units a master module;
   assigning to each of a plurality of others of the computer units a respective slave module; and
   conducting communication in master-slave operation between the master module and the slave modules for monitoring,
   wherein:
      the communication is conducted such that, in response to a query of the master module to all slave modules, each of the slave modules returns an appropriate response, and the responses are analyzed by the master module to check for faultless operation of the slave modules;

the master module sends the query to the all slave modules in a first single communication via a first slave module coupled to the master module;

the master module receives all responses of the all slave modules in a second single communication from a second slave module coupled to the master module;

the plurality of others of the computer units are serially connected such that the appropriate response of one of the slave modules assigned to one of the computer units includes a query to, and is forwarded to, a slave module assigned to a next one of the plurality of others of the computer units; and the master module sends the query of the master module to a first slave module of the serially connected slave modules and receives the responses from a last slave module of the serially connected slave modules.

11. The method according to claim 1, wherein, for an occurrence of fault, determining on which of the plurality of others of the computer units the fault occurred.

12. A method for monitoring distributed software executed on a plurality of computer units, wherein the plurality of computer units are serially connected to form a single loop, and wherein each computer unit is coupled with only two other computer units in the loop, the method comprising:

assigning to one of the computer units a master module;

assigning to each of a plurality of others of the computer units a respective slave module;

transmitting a query from the master module to all of the slave modules via a first slave module coupled to the master module; and receiving at the master module all responses of the slave modules in a single communication via a second slave module coupled to the master module, wherein:

the query is transmitted through the serially connected slave modules according to the serial order of the slave modules in the loop;

the response of one of the slave modules assigned to one of the others of the serially connected computer units includes a query to, and is forwarded to, a slave module assigned to next one of the others of the serially connected computer units; and the master module sends the query to a first slave module of the serially connected slave modules and receives the responses from a last slave module of the serially connected slave modules.

13. The method of claim 12, wherein the query, during transmission from one of the slave modules to a next of the slave modules, includes all responses of all slave modules in the loop that are between the master module and the next slave module.

14. The method of claim 12, wherein the master module includes a fixed component and a variable component.

15. The method of claim 12, wherein the slave modules include a fixed component and a variable component.

16. The method of claim 12, further comprising initiating an error response by the master module in the event of an error.

* * * * *